(12) United States Patent
Li et al.

(10) Patent No.: US 11,101,832 B1
(45) Date of Patent: Aug. 24, 2021

(54) RECEIVER ABLE TO DETECT RADIO FREQUENCY INTERFERENCE

(71) Applicant: REALTEK SEMICONDUCTOR CORPORATION, Hsinchu (TW)

(72) Inventors: Yang-Bang Li, Hsinchu (TW); Liang-Wei Huang, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 17/181,192

(22) Filed: Feb. 22, 2021

(30) Foreign Application Priority Data

Feb. 24, 2020 (TW) ................................ 109105899

(51) Int. Cl.
 H04B 1/10 (2006.01)
 H04L 25/03 (2006.01)
(52) U.S. Cl.
 CPC ..... H04B 1/1027 (2013.01); H04L 25/03159 (2013.01); *H04B 2001/1045* (2013.01)
(58) Field of Classification Search
 CPC .......... H04B 1/1027; H04B 2001/1045; H04L 25/03159
 See application file for complete search history.

(56) References Cited

U.S. PATENT DOCUMENTS

| | | | |
|---|---|---|---|
| 8,422,099 B2* | 4/2013 | Murayama | G03G 15/0131 358/498 |
| 10,530,405 B2* | 1/2020 | Arditti Ilitzky | H04L 25/08 |
| 10,791,006 B1* | 9/2020 | Lin | H04L 25/03019 |
| 2006/0045170 A1* | 3/2006 | van Rensburg | H04B 1/7107 375/148 |
| 2006/0114977 A1 | 6/2006 | Ginis et al. | |
| 2008/0160915 A1* | 7/2008 | Sommer | H04B 3/32 455/63.1 |
| 2010/0074310 A1* | 3/2010 | Roo | H04B 1/581 375/219 |
| 2010/0086019 A1* | 4/2010 | Agazzi | G01R 31/3008 375/233 |
| 2014/0286462 A1 | 9/2014 | Wu et al. | |

FOREIGN PATENT DOCUMENTS

EP 2129023 A1 12/2009

OTHER PUBLICATIONS

OA letter of the counterpart TW application (appl. No. 109105899) dated Jan. 8, 2021. Summary of the OA letter: 1.Pargraphs [0023] and [0031] of the specification are rejected as allegedly being unclear. 2.Claims 1 and 10 are rejected as allegedly being unpatentable in view of cited reference 1 (US 2006/0114977 A1) and cited reference 2 (EP 2129023 A1). 3.Claims 2-9 are allowable.

* cited by examiner

*Primary Examiner* — Freshteh N Aghdam
(74) *Attorney, Agent, or Firm* — WPAT, PC

(57) ABSTRACT

A receiver includes a first data slicer circuit and a radio interference detector circuitry. The first data slicer circuit is configured to generate a second data signal according to a first data signal. The radio interference detector circuitry is configured to generate first estimated information according to the first data signal, to generate second estimated information according to the second data signal, to generate third estimated information according to the first data signal and the second data signal, and to detect a radio interference signal according to the first estimated information, the second estimated information, and the third estimated information.

15 Claims, 5 Drawing Sheets

US 11,101,832 B1

RECEIVER ABLE TO DETECT RADIO FREQUENCY INTERFERENCE

BACKGROUND OF THE INVENTION

1. Field of the Invention

The present disclosure relates to a receiver, especially to a receiver able to detect radio interference.

2. Description of Related Art

In applications of communication circuits, a receiver is able to receive data signal(s) from other device(s). In practical applications, during a progress of transmitting the data signal(s), the data signal(s) may suffer from various noises. For example, a radio frequency interference (RFI) signal may exist in the data signal(s) received by the receiver due to certain reasons, resulting in data distortion or a failure of subsequent data decision. In some approaches, a filter circuit (e.g., a kalman filter) having higher cost is utilized to directly processes the data signal(s) received by the receiver, in order to reduce the impacts of the RFI signal. However, in these approaches, inaccurate information of the RFI signals may be obtained due to impacts from other noises.

SUMMARY OF THE INVENTION

In some embodiments, a receiver includes a first data slicer circuit and a radio interference detector circuitry. The first data slicer circuit is configured to generate a second data signal according to a first data signal. The radio interference detector circuitry is configured to generate first estimated information according to the first data signal, to generate second estimated information according to the second data signal, to generate third estimated information according to the first data signal and the second data signal, and to detect a radio interference signal according to the first estimated information, the second estimated information, and the third estimated information.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference numbers.

Figure 1:
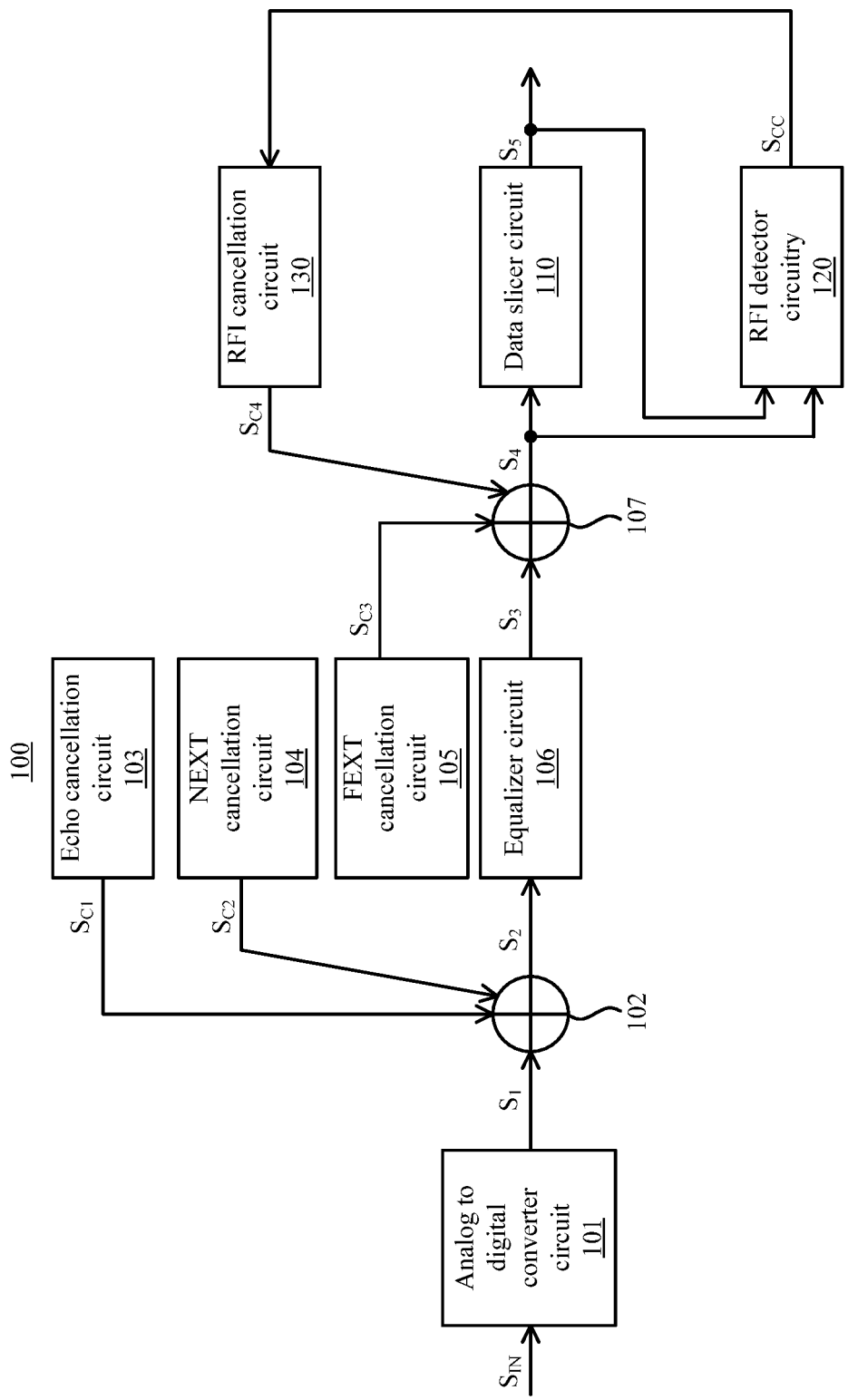
FIG. 1 is a schematic diagram of a receiver according to some embodiments of the present disclosure.

FIG. 1 is a schematic diagram of a receiver 100 according to some embodiments of the present disclosure. In some embodiments, the receiver 100 may be applied with IEEE 802.3 (2.5GBASE-T, 5GBASE-T, 10GBASE-T, etc.) standard. In some embodiments, the receiver 100 may be applied to a Giga Ethernet system.

The receiver 100 includes an analog to digital converter circuit 101, an adder circuit 102, an echo cancellation circuit 103, an near-end crosstalk (NEXT) cancellation circuit 104, a far-end crosstalk (FEXT) cancellation circuit 105, an equalizer circuit 106, the adder circuit 107, a data slicer circuit 110, a radio frequency interference (RFI) detector circuitry 120, and a RFI cancellation circuit 130, and a RFI cancellation circuit 130.

The echo cancellation circuit 103, the NEXT cancellation circuit 104, and the FEXT cancellation circuit 105 operate as a noise cancellation circuitry. The echo cancellation circuit 103 generates a correction signal $S_{C1}$, in order to reduce impacts from echo of the channel. The NEXT cancellation circuit 104 generates a correction signal $S_{C2}$, in order to reduce near-end crosstalk(s) from adjacent channel(s) in the same device. The FEXT cancellation circuit 105 generates the correction signal $S_{C3}$, in order to reduce far-end crosstalk(s) from other channels in different devices.

The analog to digital converter circuit 101 converts an input signal $S_{IN}$ to a data signal $S_1$. The adder circuit 102 sums up the data signal $S_1$, the correction signal $S_{C1}$, and the correction signal $S_{C2}$, in order to generate a data signal $S_2$. The equalizer circuit 106 generates a data signal $S_3$ according to the data signal $S_2$. In some embodiments, the equalizer circuit 106 may compensate signal losses caused by the channel. The adder circuit 107 sums up the data signal $S_3$, the correction signal $S_{C3}$, and a correction signal $S_{C4}$ to generate a data signal $S_4$. The data slicer circuit 110 generates a data signal $S_5$ according to the data signal $S_4$.

The RFI detector circuitry 120 generates first estimated information (e.g., EF1 in FIG. 2A or FIG. 2B) according to the data signal $S_4$, generates second estimated information (e.g., EF2 in FIG. 2A or FIG. 2B) according to the data signal $S_5$, and generates third estimated information (e.g., EF3 in FIG. 2A or FIG. 2B) according to the data signal $S_5$ and the data signal $S_1$. The RFI detector circuitry 120 is able to determine whether the system is affected by a RFI signal according to these estimated information, and to determine a frequency and power of the RFI signal, in order to generate a control signal $S_{CC}$. In some embodiments, information about the frequency and the power of the RFI signal are carried on the control signal $S_{CC}$. Operations regarding herein will be described with reference to FIG. 2A.

Under certain cases, if the interference from the FEXT is too high (e.g., the power of the FEXT is significantly higher than the power of the RFI signal), the first estimated information may be inaccurate. Under certain cases, if a decision result of the data slicer circuit 110 (i.e., the data signal $S_5$) is inaccurate, the second estimated information may be inaccurate. Accordingly, by fully considering an autocorrelation of the data signal $S_4$ (e.g., the estimated information EF1), an autocorrelation of the data signal $S_5$ (e.g., the estimated information EF2), and a correlation between the data signal $S_5$ and the data signal $S_4$ (e.g., the estimated information EF3), the RFI detector circuitry 120 is able to evaluate information about the RFI signal more precisely.

The RFI cancellation circuit 130 generates the correction signal $S_{C4}$ according to the control signal $S_{CC}$, and transmits the same to the adder circuit 107 to adjust the data signal $S_4$, in order to reduce impacts from the RFI signal. In some embodiments, the RFI cancellation circuit 130 may be a filter circuit that configured to perform a least mean square algorithm according to the control signal $S_{CC}$, in order to generate the correction signal $S_{C4}$.

In some related approaches, a signal received by a receiver (e.g., the input signal $S_{IN}$ or the data signal $S_1$) is directly analyzed to detect whether the RFI signal exists. However, in these approaches, the detected result may be inaccurate due to impacts from environmental noises (e.g., echo, NEXT, FEXT, channel noises, etc.). Furthermore, an expensive filter circuit is required to be employed in these approaches to simultaneously process information about frequency, phase, amplitude, etc. Compared with these approaches, in some embodiments of the present disclosure, the RFI signal is detected by utilizing the data signal $S_4$ which is (or has been) processed by (or outputted from) the noise cancellation circuitry and the equalizer circuit 106 and the data signal $S_5$ which is (or has been) processed by (or outputted from) the data slicer circuit 110. Ideally, the data signal $S_4$ and the data signal $S_5$ only include information about valid data to be received and information about the RFI signal (if the RFI signal exists). As a result, under different operating environments, the RFI detector circuitry 120 is able to generate a more accurate detection result. Moreover, the RFI detector circuitry 120 is able to detect the RFI signal without using the expensive filter circuit, and thus the required hardware cost is lower.

Figure 2A:
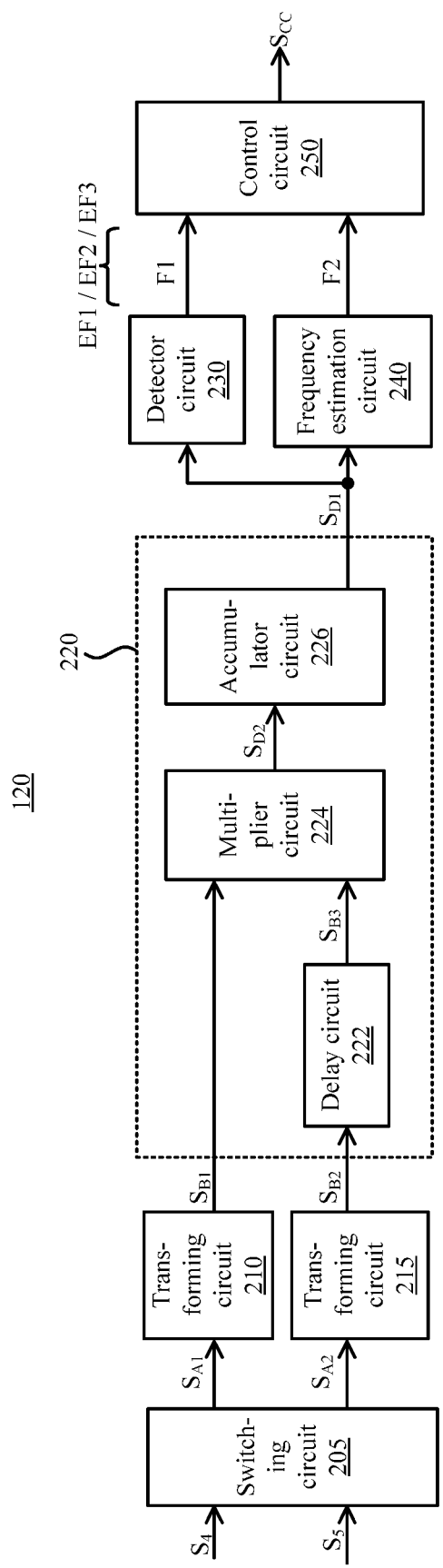
FIG. 2A is a schematic diagram of a radio interference (RFI) detector circuitry in FIG. 1 according to some embodiments of the present disclosure.

FIG. 2A is a schematic diagram of the RFI detector circuitry 120 in FIG. 1 according to some embodiments of the present disclosure. In this example, the RFI detector circuitry 120 corresponds to a loop (or a channel). The RFI detector circuitry 120 includes a switching circuit 205, a transforming circuit 210, a transforming circuit 215, an arithmetic circuit 220, a detector circuit 230, a frequency estimation circuit 240, and a control circuit 250.

The switching circuit 205 selectively outputs the data signal $S_4$, the data signal $S_5$, or both of the data signals $S_4$ and $S_5$ as a signal $Sa1$ and a signal $S_{A2}$. In some embodiments, the switching circuit 205 may be implemented with switches or a multiplexer circuit. The transforming circuit 210 transforms the signal $S_{A1}$ to a frequency domain signal $S_{B1}$. The transforming circuit 215 transforms the signal $S_{A2}$ to a frequency domain signal $S_{B2}$. In some embodiments, the transforming circuit 210 and the transforming circuit 215 may perform a fast Fourier transform on the signal $S_{A1}$ and the signal $S_{A2}$, in order to generate a frequency domain signal $S_{B1}$ and a frequency domain signal $S_{B2}$.

When the switching circuit 205 outputs the data signal $S_4$ as the signal $S_{A1}$ and the signal $S_{A2}$, the frequency domain signal $S_{B1}$ and the frequency domain signal $S_{B2}$ are all generated based on the data signal $S_4$. Under this condition, the RFI detector circuitry 120 generates the estimated information EF1. When the switching circuit 205 outputs the data signal $S_5$ as the signal $S_{A1}$ and the signal $S_{A2}$, the frequency domain signal $S_{B1}$ and the frequency domain signal $S_{B2}$ are all generated based on the data signal $S_5$. Under this condition, the RFI detector circuitry 120 generates the estimated information EF2. When the switching circuit 205 outputs the data signal $S_5$ and the data signal $S_4$ as the signal $S_{A1}$ and the signal $S_{A2}$ respectively, the frequency domain signal $S_{B1}$ is generated based on the data signal $S_5$, and the frequency domain signal $S_{B2}$ is generated based on the data signal $S_4$. Under this condition, the RFI detector circuitry 120 generates the estimated information EF3.

The arithmetic circuit 220 determines a correlation between the frequency domain signal $S_{B1}$ and the frequency domain signal $S_{B2}$, in order to generate an accumulated signal $S_{D1}$. If the RFI signal exists, a periodic RFI signal having a single tone can be found in the frequency domain signal $S_{B1}$ and the frequency domain signal $S_{B2}$. Therefore, by analyzing the correlation between these two signals, whether the RFI signal exists can be determined.

The arithmetic circuit 220 includes a delay circuit 222, a multiplier circuit 224, and an accumulator circuit 226. The delay circuit 222 delays the frequency domain signal $S_{B2}$, in order to generate a frequency domain signal $S_{B3}$. The multiplier circuit 224 multiplies the frequency domain signal $S_{B1}$ with the frequency domain signal $S_{B3}$, in order to generate a signal $S_{D2}$. The accumulator circuit 226 accumulates the signal $S_{D2}$ for a predetermined interval, in order to generate the accumulated signal $S_{D1}$. In some embodiments, operations of the above circuits are to perform a correlation calculation.

The detector circuit 230 detects the RFI signal according to the accumulated signal $S_{D1}$, in order to generate information F1 in a corresponding one of estimated information EF1-EF3. The information F1 is to indicate whether the RFI signal exists. Operations regarding herein will be described with reference to FIG. 3. The frequency estimation circuit 240 performs a frequency bin search operation according to the accumulated signal $S_{D1}$, in order to generate information F2 in a corresponding one of the estimated information EF1-EF3. The information F2 is to indicate the frequency and the power of the RFI signal. Operations regarding herein will be described with reference to FIG. 4.

After the estimated information EF1-EF3 are received, the control circuit 250 determines whether the RFI signal exists and determines the frequency and the power of the RFI signal according to the estimated information EF1-EF3, in order to output the control signal $S_{CC}$. In some embodiments, the control circuit 250 performs a weighted calculation according to the estimated information EF1-EF3, in order to obtain information about the frequency and the power of the RFI signal, and to output the same to be the control signal $S_{CC}$. For example, the information F2 of the estimated information EF1 corresponds to the weight W1, the information F2 in the estimated information EF2 corresponds to the weight W2, and the information F2 in the estimated information EF3 corresponds to the weight W3. The control circuit 250 performs a weighted summing calculation or a weighted averaging calculation according to the weights W1-W3 and the information F2 in the estimated information EF1-EF3, in order to determine the frequency and the power of the RFI signal.

In some embodiments, values of the weights W1-W3 can be set in advance. In some embodiments, the control circuit 250 may set the value of the weight W1 according to the information F1 in the estimated information EF1, set the value of the weight W2 according to the information F1 in the estimated information EF2, and set the value of the weight W3 according to the information F1 in the estimated information EF3. For example, according to the information F1 in the estimated information EF1, the control circuit 250 determines that the RFI signal exists. According to the information F1 in the estimated information EF2, the control circuit 250 determines that the RFI signal does not exist. According to the information F1 in the estimated information EF3, the control circuit 250 determines that the RFI signal exists. Under this condition, the control circuit 250 may set the weight W3 to be greater than or equal to the weight W1, and set the weight W2 to be less than the weight W1. The configurations of the weights are given for illustrative purposes, and the present disclosure is not limited thereto.

In some embodiments, each of the detector circuit 230, the frequency estimation circuit 240, and the control circuit 250 may be implemented with at least one digital signal processor signal having a computing capability, in order to perform operations in various embodiments. In some embodiments, certain circuits in the RFI detector circuitry 120 (e.g., the transforming circuit 210, the transforming circuit 215, the arithmetic circuit 220, etc.) may be shared with the noise cancellation circuitry. As a result, circuit area and cost of the receiver 100 can be further saved.

Figure 2B:
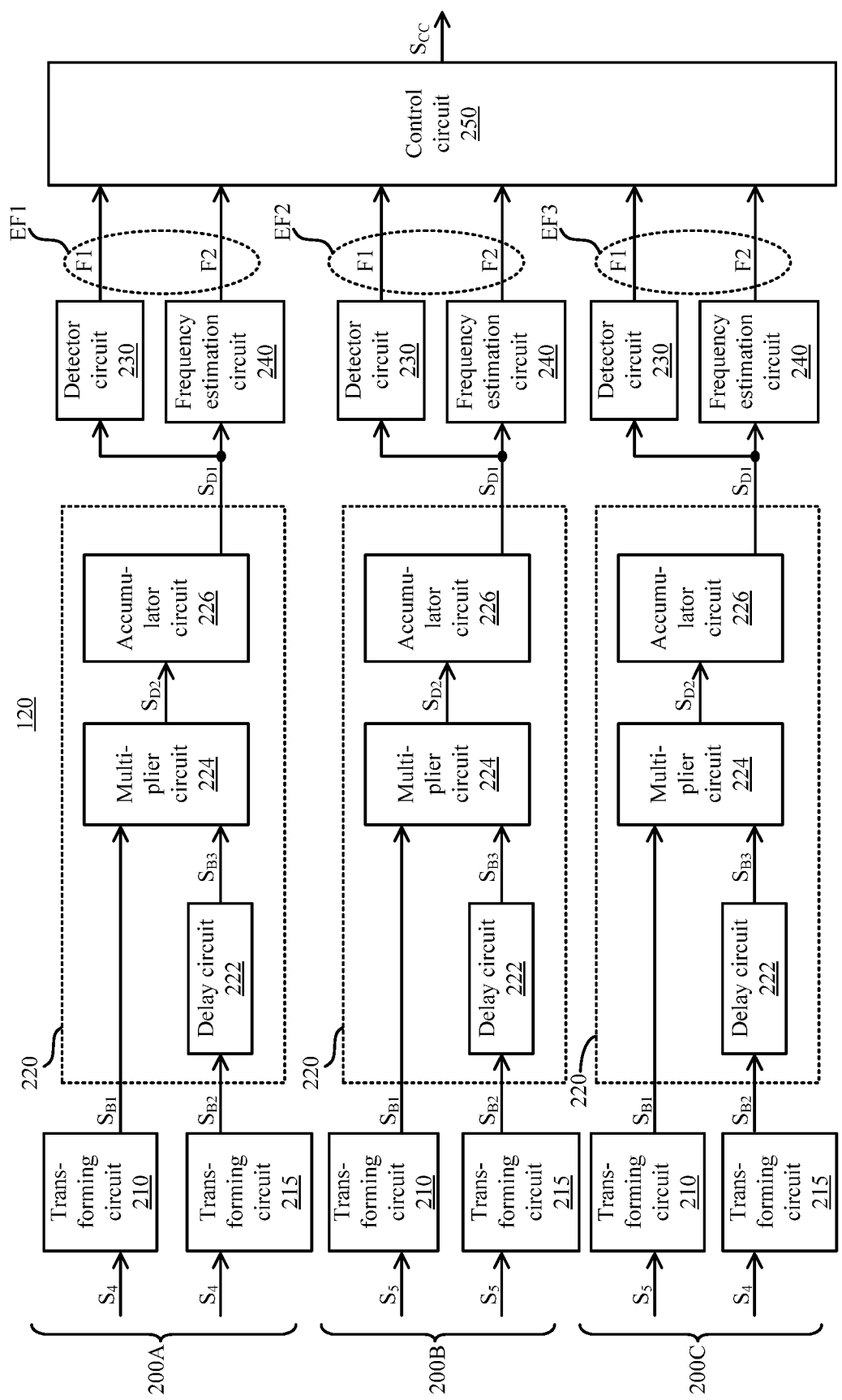
FIG. 2B is a schematic diagram of the RFI detector circuitry in FIG. 1 according to some embodiments of the present disclosure.

FIG. 2B is a schematic diagram of the RFI detector circuitry 120 in FIG. 1 according to some embodiments of the present disclosure. Compared to FIG. 2A, in this example, the RFI detector circuitry 120 excludes the switching circuit 205. The RFI detector circuitry 120 includes sets of circuits 200A, 200B, and 200C, and the control circuit 250. Circuit architecture in each set of circuits 200A, 200B, and 200C is the same as that of the transforming circuit 210, the transforming circuit 215, the arithmetic circuit 220, the detector circuit 230, and the frequency estimation circuit 240 in FIG. 2A, and thus the repetitious descriptions are not further given.

Similar to FIG. 2A, the first set of circuits 200A performs the correlation calculation according to the data signal $S_4$ and a delayed signal corresponding to the data signal $S_4$ (e.g., the frequency domain signal $S_{B3}$), in order to generate the estimated information EF1. The second set of circuits 200B performs the correlation calculation according to the data signal $S_5$ and a delayed signal corresponding to the data signal $S_5$ (e.g., the frequency domain signal $S_{B3}$), in order to generate the estimated information EF2. The third set of circuits 200C performs the correlation calculation according to the data signal $S_5$ and a delayed signal corresponding to the data signal $S_4$ (e.g., the frequency domain signal $S_{B3}$), in order to generate the estimated information EF3.

Figure 3:
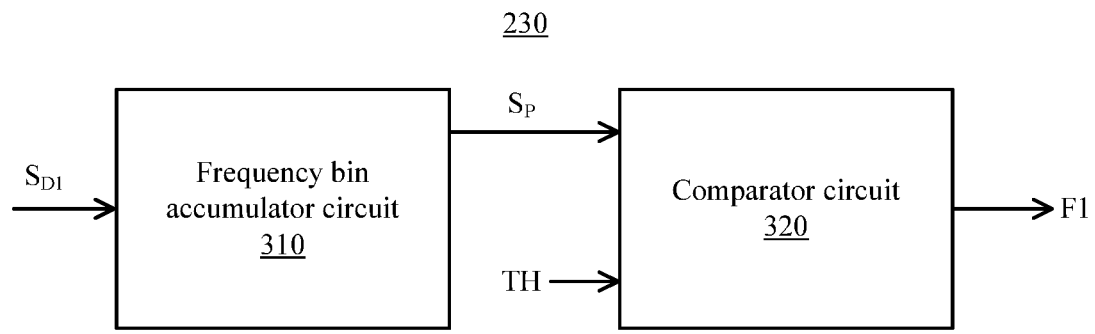
FIG. 3 is a schematic diagram of the detector circuit in FIG. 2A (or FIG. 2B) according to some embodiments of the present disclosure.

FIG. 3 is a schematic diagram of the detector circuit 230 in FIG. 2A (or FIG. 2B) according to some embodiments of the present disclosure. The detector circuit 230 includes a frequency bin accumulator circuit 310 and a comparator circuit 320. The frequency bin accumulator circuit 310 processes the accumulated signal $S_{D1}$ to generate a power signal $S_P$. For example, the frequency bin accumulator circuit 310 may operate as a frequency bin energy accumulator that analyzes the frequency spectrum of the accumulated signal $S_{D1}$, in order to separate the accumulated signal $S_{D1}$ into multiple frequency bins. Afterwards, the frequency bin accumulator circuit 310 sums up signal power in each frequency bin, in order to output the power signal $S_P$. The comparator circuit 320 compares the power signal $S_P$ with a predetermined threshold TH, in order to determine whether the RFI signal exists to output the information F1. For example, if the power signal $S_P$ is greater than the predetermined threshold TH, the comparator circuit 320 is able to output the information F1 having a first value, in order to indicate that the RFI signal exists. Alternatively, if the power signal $S_P$ is not greater than the predetermined threshold TH, the comparator circuit 320 is able to output the information F1 having a second value, in order to indicate that the RFI signal does not exist. In some embodiments, as a signal having extreme low frequency is easily suffered by noises, the frequency bin accumulator circuit 310 may accumulate signal power (i.e., energy) in a frequency bin corresponding to the extreme low frequency to generate an additional power signal, and may accumulate signal power in remaining frequency bins corresponding to other frequencies to generate the power signal $S_P$. This additional power signal can be processed with other analysis, in order to assist in obtaining information about the RFI signal, in order to prevent the power signal $S_P$ from being inaccurate.

Figure 4:
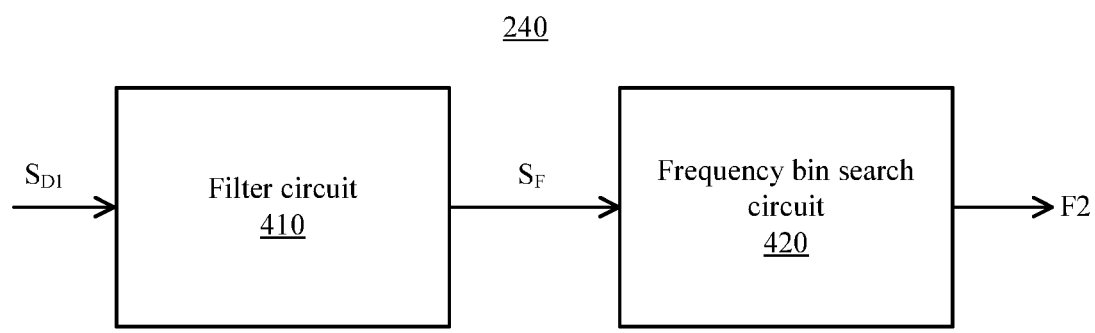
FIG. 4 is a schematic diagram of the frequency estimation circuit in FIG. 2A (or FIG. 2B) according to some embodiments of the present disclosure.

FIG. 4 is a schematic diagram of the frequency estimation circuit 240 in FIG. 2A (or FIG. 2B) according to some embodiments of the present disclosure. The frequency estimation circuit 240 includes a filter circuit 410 and a frequency bin search circuit 420. The filter circuit 410 filters out noises (e.g., the FEXT) in the accumulated signal SDI and generates a signal $S_F$ accordingly. As a result, the possibility of the inaccurate detection, which is due to the RFI signal having the power lower than the power of other noises, is reduced. The frequency bin search circuit 420 determines the frequency and the power of the RFI signal according to the signal $S_F$, in order to generate the information F2. For example, the frequency bin search circuit 420 is able to analyze a frequency spectrum of the signal $S_F$, and separates the signal $S_F$ into multiple frequency bins. Afterwards, the frequency bin search circuit 420 may sweep information of these frequency bins to find a signal (i.e., the RFI signal) having the maximum power. As a result, the frequency bin search circuit 420 is able to obtain the power and the frequency of the RFI signal, and to output the information of the power and the frequency as the information F2.

In some embodiments, as the frequency bins are discrete, the frequency of the RFI signal may falls between two frequency bins (hereinafter referred to as "frequency bin Fbin1" and "frequency bin Fbin2"). Under this condition, the power of each of the frequency bin Fbin1 and the frequency bin Fbin2 is greater than a predetermined threshold, and thus it is able to determine that the frequency of the RFI signal falls between the frequency bin Fbin1 and the frequency bin Fbin2. The frequency bin search circuit 420 may determine a ratio of the power of the frequency bin Fbin1 to that of the frequency bin Fbin2. If this ratio is great than 1, it indicates that the frequency of the RFI signal is close to the frequency bin Fbin1. Alternatively, if the ratio is less than 1, it indicates the frequency of the RFI signal is close to the frequency bin Fbin2.

In some embodiments, the frequency bin search circuit 420 may find a frequency bin having the maximum power (i.e., energy) (hereinafter referred to as "frequency bin F[y]"), and may perform a liner interpolation calculation according to the frequency bin F[y] and its adjacent frequency bins (e.g., the frequency bin F[y−1] and the frequency bin F[y+1]), in order to determine the frequency of the RFI signal. The above operations of the frequency bin search circuit 420 are given for illustrative purposes, and the present disclosure is not limited thereto.

As described above, in examples of FIG. 2A or FIG. 2B, the RFI detector circuitry 120 corresponds to one loop (or channel). In some embodiments, as shown in FIG. 5, the RFI detector circuitry 120 may be applied to multiple loops (or channels).

Figure 5:
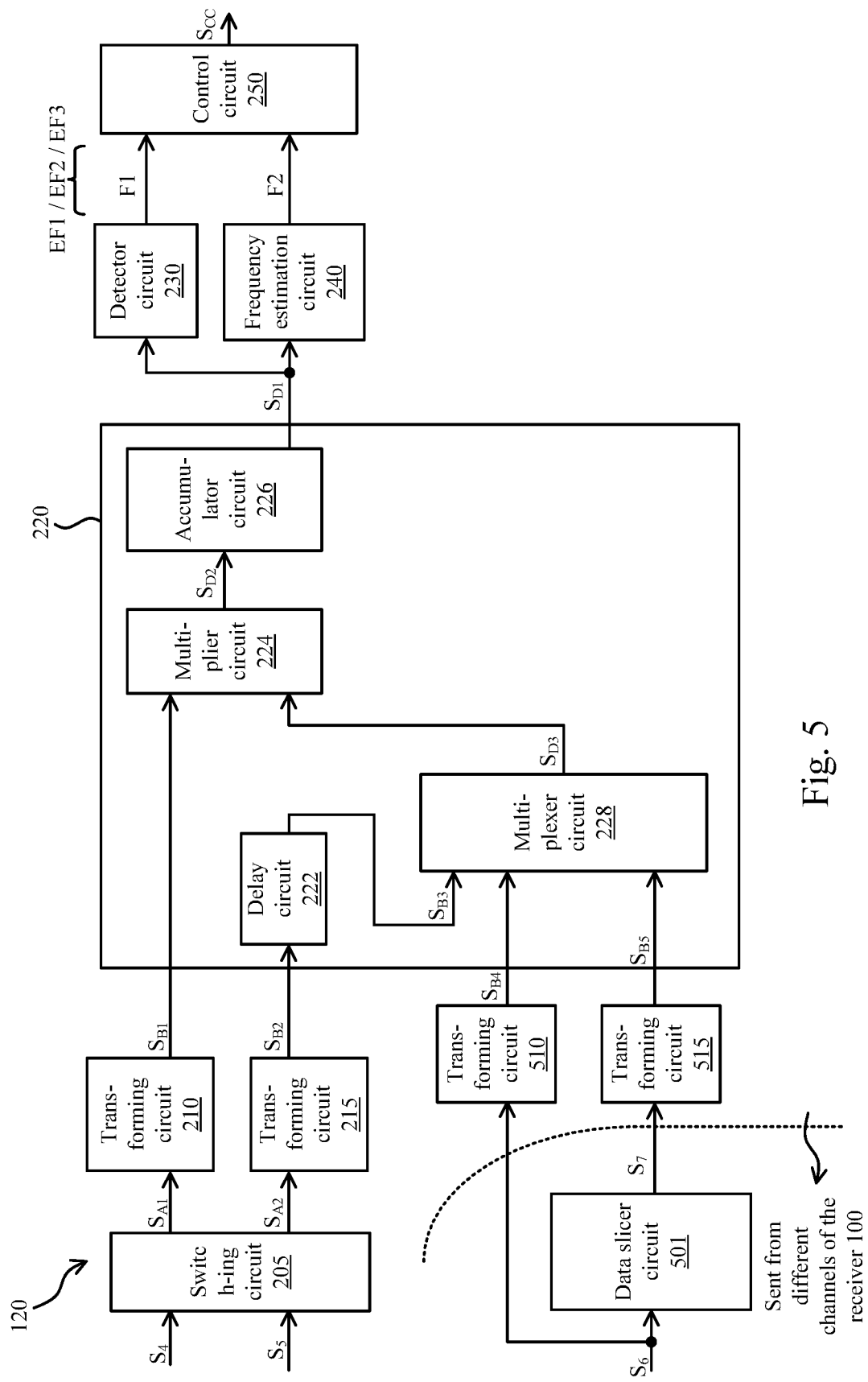
FIG. 5 is a schematic diagram of the RFI detector circuitry according to some embodiments of the present disclosure.

FIG. 5 is a schematic diagram of the RFI detector circuitry 120 according to some embodiments of the present disclosure. In this example, the receiver 100 further includes a data slicer circuit 501. The data slicer circuit 110 and the data slicer circuit 501 are circuits in different channels of the receiver 100. The data slicer circuit 501 generates a data signal $S_7$ according to a data signal $S_6$. Similar to the data signal $S_4$, the data signal $S_6$ is a signal that is (or has been) processed by (or outputted from) the noise cancellation circuitry and the equalizer circuit in the corresponding channel.

In this example, the RFI detector circuitry 120 further includes a transforming circuit 510, a transforming circuit 515, and the arithmetic circuit 220 further includes a multiplexer circuit 228. The transforming circuit 510 transforms the data signal $S_6$ to a frequency domain signal $S_{B4}$. The transforming circuit 515 transforms the data signal $S_7$ to a frequency domain signal $S_{B5}$. The multiplexer circuit 228 selectively outputs the frequency domain signal $S_{B3}$, the frequency domain signal $S_{B4}$, or the frequency domain signal $S_{B5}$ as a signal $S_{D3}$. The multiplier circuit 224 multiplies the frequency domain signal $S_{B1}$ with the signal $S_{D3}$, in order to generate the signal $S_{D2}$. Theoretically, if the RFI signal exists, the channels in the same receiver 100 suffer the impacts from RFI signals having the same frequency. Therefore, in this example, the RFI detector circuitry 120 is able to detect whether the RFI signal exists according to a correlation between input signals (and/or output signals) of the data slicer circuits in different channels.

FIG. 5 is described with two channels for illustrative purposes, but the present disclosure is not limited thereto. According to requirements of a communication specification, the receiver 100 may include more channels.

As described above, the receiver and the RFI detector circuitry provided in some embodiments of the present disclosure are able to detect whether the RFI signal exists in the system according to data signal(s) processed by (or outputted from) the noise cancellation circuitry and the equalizer circuit and data signal(s) processed by (or outputted from) the data slicer circuit. As a result, a more accurate detection result can be obtained. Moreover, in multichannel applications, the RFI detector circuitry may further utilize data signals from different channels to detect the RFI signal.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A receiver, comprising:
    a first data slicer circuit configured to generate a second data signal according to a first data signal; and
    a radio interference detector circuitry configured to:
        generate first estimated information according to the first data signal;
        generate second estimated information according to the second data signal;
        generate third estimated information according to the first data signal and the second data signal; and
        detect a radio interference signal according to the first estimated information, the second estimated information, and the third estimated information.

2. The receiver of claim 1, wherein the radio interference detector circuitry comprises:
    an arithmetic circuit configured to determine a correlation between a first frequency domain signal and a second frequency domain signal, in order to generate an accumulated signal, wherein each of the first frequency domain signal and the second frequency domain signal is generated based on the first data signal or the second data signal;
    a detector circuit configured to detect the radio interference signal according to the accumulated signal, in order to generate first information of a corresponding one of the first estimated information, the second estimated information, and the third estimated information;
    a frequency estimation circuit configured to perform a frequency bin search operation according to the accumulated signal, in order to generate second information of the corresponding one of the first estimated information, the second estimated information, and the third estimated information; and
    a control circuit configured to determine a frequency of the radio interference signal and power of the radio interference signal according to the first estimated information, the second estimated information, and the third estimated information, in order to generate a control signal.

3. The receiver of claim 2, wherein the radio interference detector circuitry further comprises:
    a first transforming circuit configured to transform the first data signal or the second data signal to the first frequency domain signal; and a second transforming circuit configured to transform the first data signal or the second data signal to the second frequency domain signal.

4. The receiver of claim 2, further comprising:
a radio interference cancellation circuit configured to generate a correction signal according to the control signal, in order to adjust the first data signal.

5. The receiver of claim 2, wherein the arithmetic circuit comprises:
a delay circuit configured to delay the second frequency domain signal, in order to generate a third frequency domain signal;
a multiplier circuit configured to multiple the first frequency domain signal with the third frequency domain signal, in order to generate a first signal; and
an accumulator circuit configured to accumulate the first signal to generate the accumulated signal.

6. The receiver of claim 5, further comprising:
a second data slicer circuit configured to output a fourth data signal according to a third data signal, wherein the arithmetic circuit further comprises a multiplexer circuit, the multiplexer circuit is configured to output the third frequency domain signal, a fourth frequency domain signal, or a fifth frequency domain signal as a second signal, the fourth frequency domain signal is generated based on the third data signal, the fifth frequency domain signal is generated based on the fourth data signal, and the multiplier circuit is further configured to multiply the first frequency domain signal with the second signal to generate the first signal.

7. The receiver of claim 6, wherein the radio interference detector circuitry further comprises:
a third transforming circuit configured to transform the third data signal to the fourth frequency domain signal; and
a fourth transforming circuit configured to transform the fourth data signal to the fifth frequency domain signal.

8. The receiver of claim 6, wherein the third data signal is a signal processed by or outputted from a noise cancellation circuitry and an equalizer circuit.

9. The receiver of claim 2, wherein the detector circuit comprises:
a frequency bin accumulator circuit configured to generate a power signal according to the accumulated signal; and
a comparator circuit configured to compare the power signal with a predetermined threshold to determine whether the radio interference signal exists, in order to generate the first information.

10. The receiver of claim 2, wherein the frequency estimation circuit comprises:
a filter circuit configured to perform a filtering operation to the accumulated signal to generate a first signal; and
a frequency bin search circuit configured to determine the frequency and the power of the radio frequency signal according to the first signal, in order to generate the second information.

11. The receiver of claim 2, wherein when the first frequency domain signal and the second frequency domain signal are all generated based on the first data signal, the corresponding one of the first estimated information, the second estimated information, and the third estimated information is the first estimated information, when the first frequency domain signal and the second frequency domain signal are all generated based on the second data signal, the corresponding one of the first estimated information, the second estimated information, and the third estimated information is the second estimated information, and when the first frequency domain signal is generated based on the second data signal and the second frequency domain signal is generated based on the first data signal, the corresponding one of the first estimated information, the second estimated information, and the third estimated information is the third estimated information.

12. The receiver of claim 1, wherein the first data signal is a signal processed by or outputted from a noise cancellation circuitry and an equalizer circuit.

13. The receiver of claim 1, wherein the radio interference detector circuitry is configured to perform a correlation calculation according to the first data signal and a delayed signal corresponding to the first data signal, in order to generate the first estimated information.

14. The receiver of claim 1, wherein the radio interference detector circuitry is configured to perform a correlation calculation according to the second data signal and a delayed signal corresponding to the second data signal, in order to generate the second estimated information.

15. The receiver of claim 1, wherein the radio interference detector circuitry is configured to perform a correlation calculation according to the second data signal and a delayed signal corresponding to the first data signal, in order to generate the third estimated information.

* * * * *